(12) United States Patent
Shanabrook et al.

(10) Patent No.: US 8,713,693 B2
(45) Date of Patent: Apr. 29, 2014

(54) SECURE ACCESS TO CUSTOMER LOG DATA IN A MULTI-TENANT ENVIRONMENT

(75) Inventors: Susan Shanabrook, Safety Harbor, FL (US); Denise Glaser, San Francisco, CA (US); Narayan Bharadwaj, Fremont, CA (US)

(73) Assignee: salesforce.com, inc., San Francisco, CA (US)

( * ) Notice: Subject to any disclaimer, the term of this patent is extended or adjusted under 35 U.S.C. 154(b) by 71 days.

(21) Appl. No.: 13/559,304

(22) Filed: Jul. 26, 2012

(65) Prior Publication Data

US 2013/0031613 A1    Jan. 31, 2013

Related U.S. Application Data

(60) Provisional application No. 61/511,806, filed on Jul. 26, 2011.

(51) Int. Cl.
*H04L 29/06* (2006.01)

(52) U.S. Cl.
USPC .......................................................... 726/26

(58) Field of Classification Search
CPC ...... G06F 21/31; G06F 21/62; G06F 21/6218
USPC .......................................... 726/2, 26, 27, 28
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |

(Continued)

OTHER PUBLICATIONS

Splunk 4.3.4 User Manual, Generated: Oct. 17, 2012, Copyright 2012 Splunk, Inc.

*Primary Examiner* — Edward Zee
(74) *Attorney, Agent, or Firm* — Ingrassia Fisher & Lorenz, P.C.

(57) ABSTRACT

Systems and methods process log data relating to usage of a multi-tenant application server. An input module receives a request from a user that identifies requested log data by a particular user or tenant of the multi-tenant application system. A log query service automatically formats the database query for the requested log data based upon the request received from the user, and stores the formatted database query on the storage device. A batch server subsequently retrieves the database query from the storage device, submits the database query to the data analysis engine, obtains the requested information from the data analysis engine after the query is completed, and notifies the user that the requested information is available for output.

17 Claims, 3 Drawing Sheets

(56) References Cited

U.S. PATENT DOCUMENTS

Figure 1:
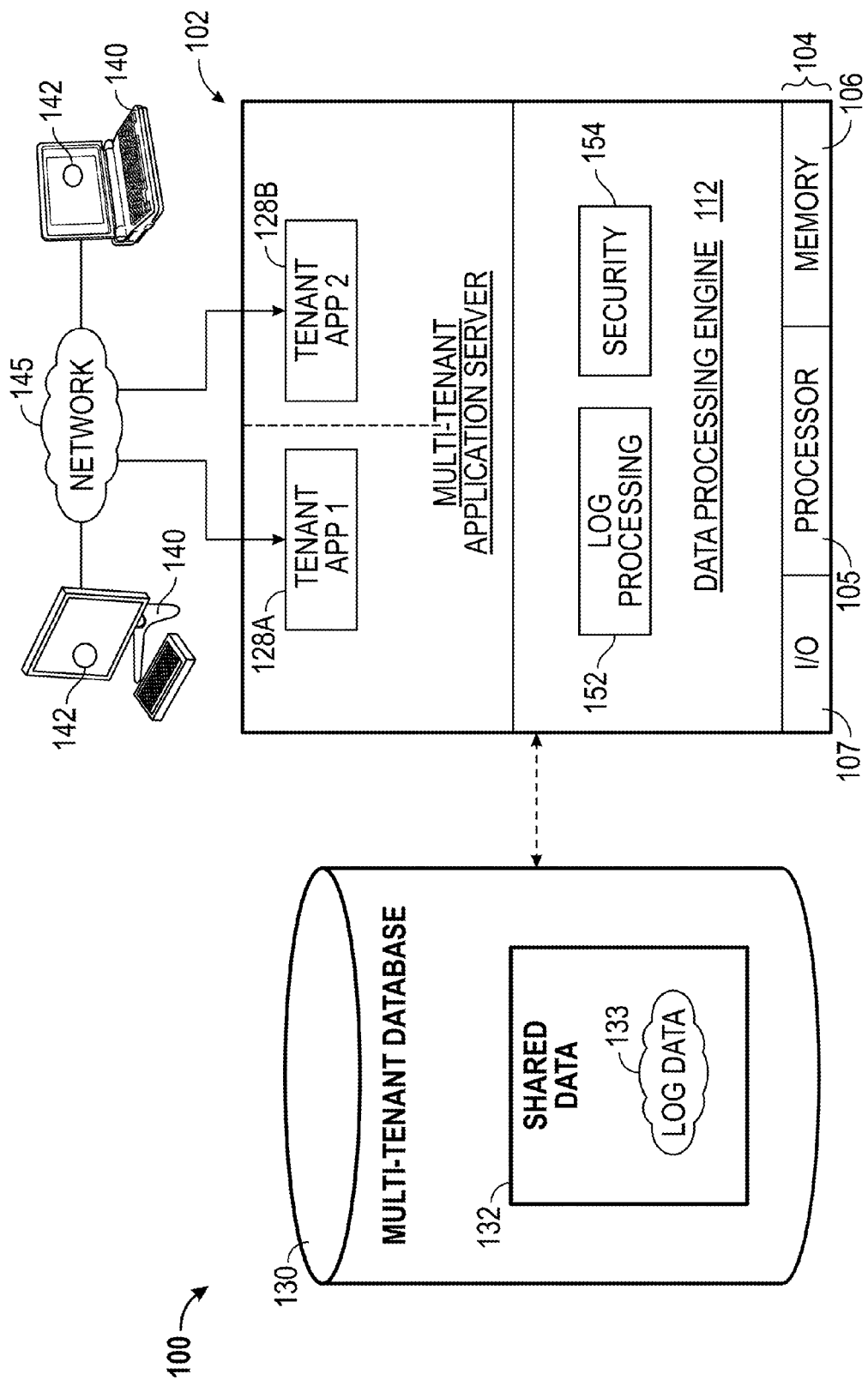

| Patent No. | Date | Inventor(s) |
|---|---|---|
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,340,411 B2 | 3/2008 | Cook |
| 7,620,655 B2 | 11/2009 | Larsson et al. |
| 7,698,160 B2 | 4/2010 | Beaven et al. |
| 8,082,301 B2 | 12/2011 | Ahlgren et al. |
| 8,095,413 B1 | 1/2012 | Beaven |
| 8,095,594 B2 | 1/2012 | Beaven et al. |
| 8,275,836 B2 | 9/2012 | Beaven et al. |
| 2001/0044791 A1 | 11/2001 | Richter et al. |
| 2002/0072951 A1 | 6/2002 | Lee et al. |
| 2002/0082892 A1 | 6/2002 | Raffel |
| 2002/0129352 A1 | 9/2002 | Brodersen et al. |
| 2002/0140731 A1 | 10/2002 | Subramanian et al. |
| 2002/0143997 A1 | 10/2002 | Huang et al. |
| 2002/0162090 A1 | 10/2002 | Parnell et al. |
| 2002/0165742 A1 | 11/2002 | Robins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2012/0096525 A1* | 4/2012 | Bolgert et al. .................. 726/6 |
| 2012/0144332 A1 | 6/2012 | Sola |
| 2012/0179646 A1* | 7/2012 | Hinton et al. ................. 707/607 |

* cited by examiner

SECURE ACCESS TO CUSTOMER LOG DATA IN A MULTI-TENANT ENVIRONMENT

PRIORITY CLAIM

This application claims priority to U.S. Provisional Application Ser. No. 61/511,806, which was filed on Jul. 26, 2011 and is incorporated herein by reference.

TECHNICAL FIELD

The following relates to data processing systems and methods that use shared network-based computing platforms to support multiple applications executing on behalf of different customer tenant organizations, each having multiple users. More particularly, the following relates to secure processing of shared electronic log data maintained by a multi-tenant application server.

BACKGROUND

Modern "cloud"-based computer systems provide access to information via the Internet or another network. In contrast to more conventional client-server systems in which individual computing applications are hosted on specific server platforms, the cloud computing model provides applications "as a service" over the network.

Multi-tenant cloud architectures, in particular, allow different customer organizations (often called "tenants") to share computing resources without sacrificing data security. "Multi-tenancy" in this context generally refers to a computing system in which a single computing platform simultaneously supports multiple customer organizations or other groups of users using a shared data store. The shared platform in the multi-tenant architecture is usually designed to virtually separate each tenant's data and operations from those of other tenants so that each tenant works with its own virtual application instance, even though all of the tenants' applications physically share common processing hardware and data storage. The Force.com service available from salesforce.com of San Francisco, Calif., for example, provides an application-centric service that completely abstracts the server hardware from the customer and that allows multiple tenants to simultaneously yet securely implement a wide variety of data-driven applications that are accessible via the Internet or a similar network.

As users associated with the various tenants use the multi-tenant application server, the system typically maintains an electronic log of each user's actions. This log can be used for troubleshooting, compliance, security monitoring, evaluating hardware or software performance, and/or for any other purposes. Challenges often arise, however, in securely yet effectively granting access to log file data associated with each tenant. A tenant administrator, for example, may wish to obtain data that is specific to a particular user or a particular feature of the service from a shared electronic log. Due to the nature of the multi-tenant system, it can be difficult in practice to provide approved log information to approved users while restricting access to other data that may be present in the shared log file.

It is therefore desirable to create systems and processes for granting secure access to data stored in a log file that is shared between multiple tenants of a multi-tenant application server. These and other features will become more evident from the following discussion.

DESCRIPTION OF THE DRAWING FIGURES

Figure 2:
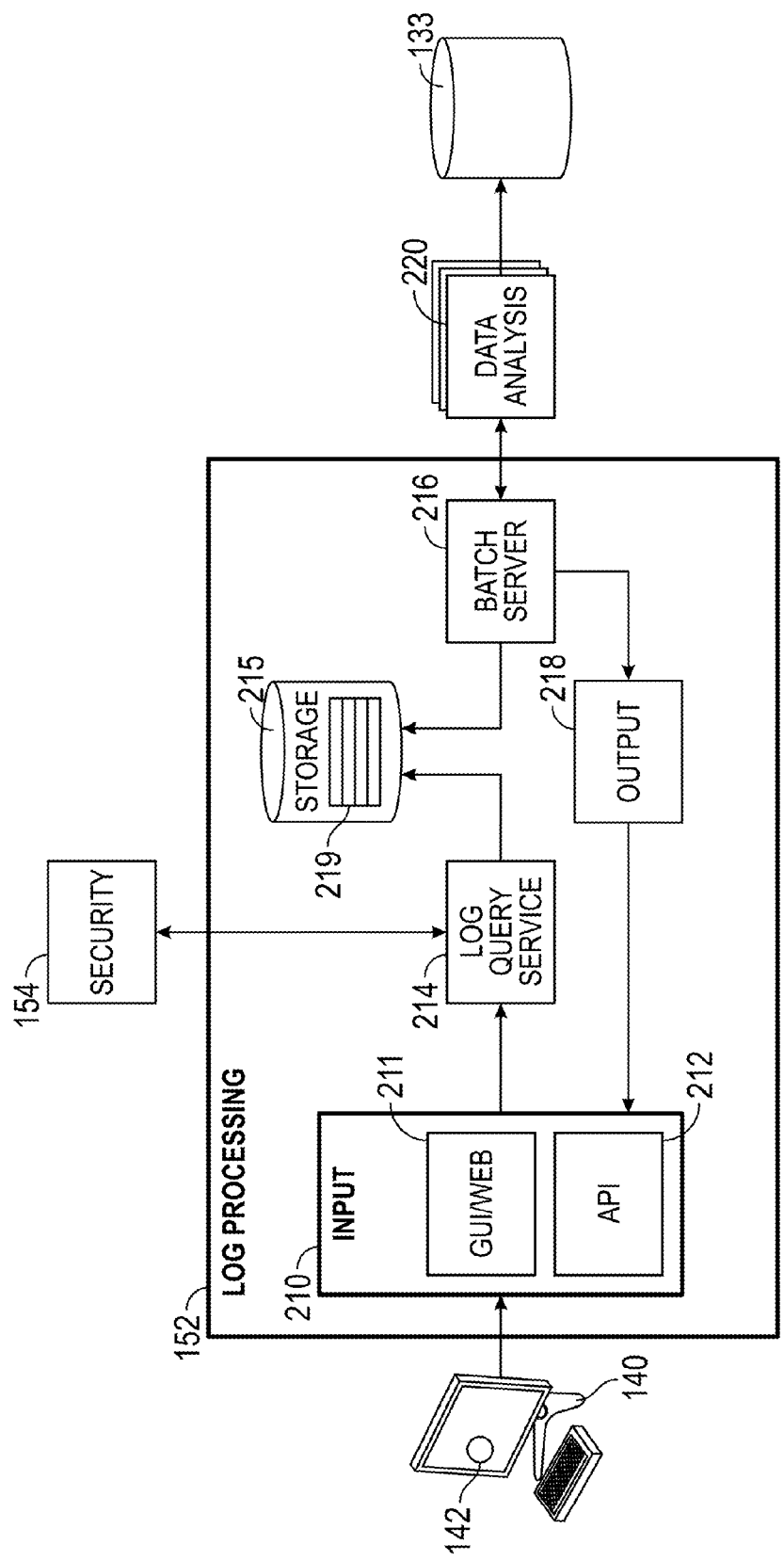
Figure 3:
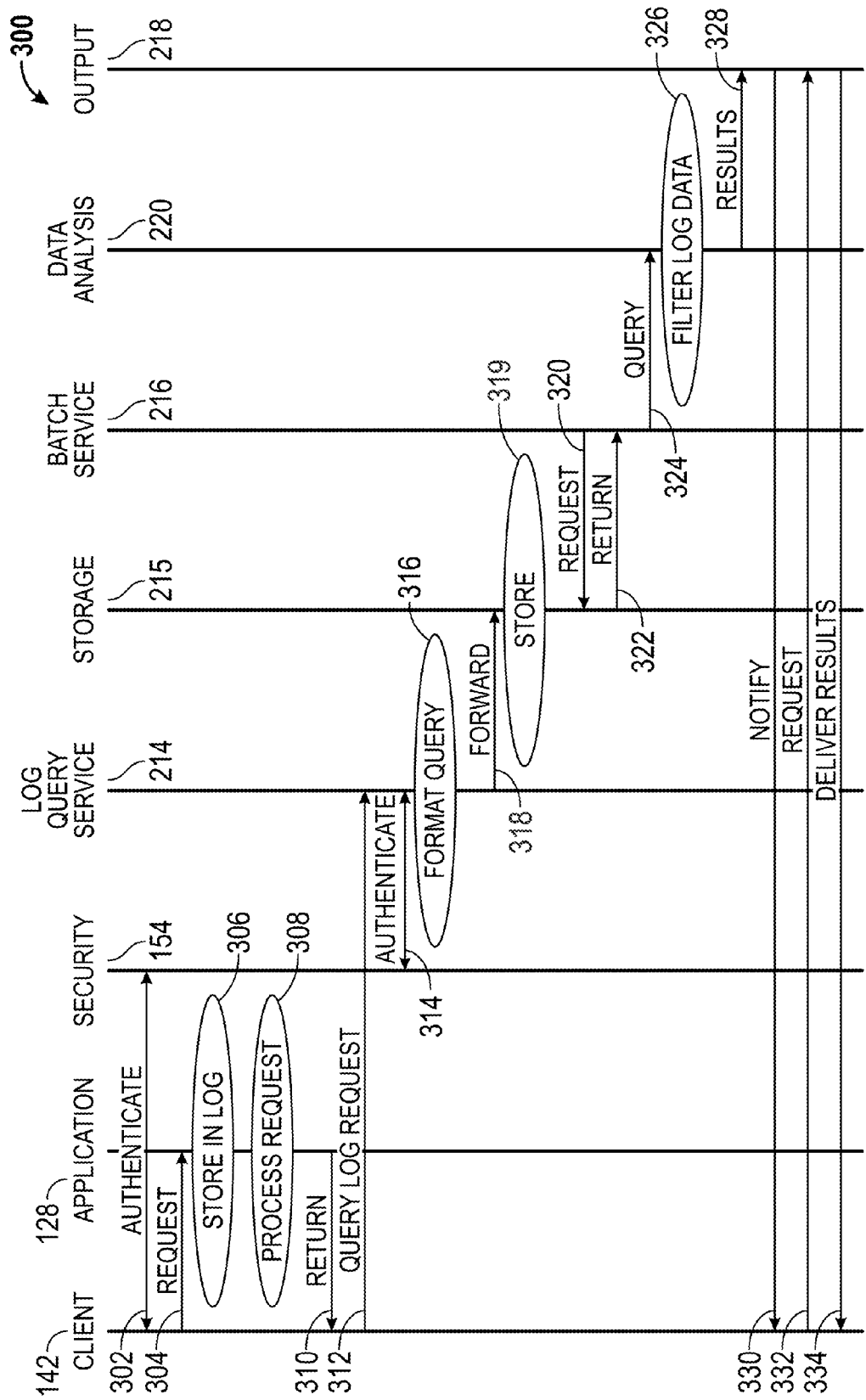

Exemplary embodiments will hereinafter be described in conjunction with the following drawing figures, wherein like numerals denote like elements, and FIG. 1 is a diagram showing an exemplary embodiment of a system for processing log data requests for a multi-tenant application service;

FIG. 2 is a block diagram of an exemplary embodiment of a log data processing system; and FIG. 3 is a diagram showing an exemplary process for processing log data requests for a multi-tenant application service.

DETAILED DESCRIPTION

Various systems and methods are described to securely process shared log data relating to usage of a multi-tenant application server. Providing secure access to shared log data allows for improved trust and visibility for customers of the shared service.

According to various embodiments, a data analysis engine that processes shared log data is isolated from direct network access through the use of a query service that places requests for log data onto a queue for subsequent retrieval. Queries are later retrieved from the queue by a separate server (e.g., a batch server) that directly interacts with the data analysis engine as appropriate. By using two separate processes to place shared log queries onto the queue and to remove the queries from the queue for processing, the analysis engine and the shared log are isolated from direct queries, thereby improving access to shared log data without sacrificing the security of the system or the data.

Additional features may also be provided. Various embodiments can use batch processing and scheduling to prevent overloading of the computing resources used to perform the log file analysis, for example. Processing of log file queries can be scheduled for off-peak processing times, and/or processing can be spread across multiple analysis engines to prevent overloading of any one engine. Other embodiments could provide any number of dashboards, analytics, reports or other processed outputs to further improve feedback to the tenants. Various embodiments therefore allow the provider of a multi-tenant application service to greatly improve access to tenant log data without sacrificing the security of the shared system.

In an exemplary implementation of a data processing system for processing log files, then, an input module suitably receives a request from a user that identifies requested log data by a particular user or tenant of the multi-tenant application system. A log query service automatically formats the database query for the requested log data based upon the request received from the user, and stores the formatted database query on a storage device. A batch server subsequently retrieves one or more database queries from the storage device, submits the database queries to the data analysis engine, obtains the requested information from the data analysis engine after the queries are completed, and notifies the user that the requested information is available for output. Other embodiments may provide different methods, systems, devices or the like that modify or augment these various features and functions in any manner.

Turning now to the drawing figures and with initial reference to FIG. 1, an exemplary multi-tenant application system 100 for providing client applications 128A-B associated with multiple customer organizations or other tenants suitably includes one or more application servers 102 that provide one or more tenant applications 128A-B using a data processing engine 112. Each application 128A-B provides information or other services to one or more client applications 142A-B executing on one or more client computer systems 140A-B, respectively. Generally speaking, a user of a client system 140 invokes a browser or other client program 142 that is able to contact an appropriate server application 128A-B via the Internet or another network 145. The server application 128 makes use of appropriate security features 154 in server 102 to ensure that the user is authorized to use the application 128. In various embodiments, a user initially authenticates with security module 154 to obtain a valid sessionID that can be used during subsequent interactions with applications 128A-B. The application validates the sessionID before providing access to sensitive data 132 from shared database 130. This sessionID may be provided as part of a conventional hypertext transport protocol (HTTP) "get" or "put" statement, for example, or as part of an API that allows interactions between client program 142 and server applications 128A-B.

The various interactions between the client program 142 and server applications 128A-B are stored as log data 133 in shared database 130. Information stored for each interaction may include, for example, internet protocol (IP) or other address information, UserID, ClientID, SessionID, TenantID, identification of the information placed or requested by the client, time and date, and/or the like. By storing such information about every interaction, a very robust and complete log file 133 can be created. As noted herein, the log file 133 may be a shared file that collects data entries for multiple users, tenants and client applications executing within system 100, as desired.

The information stored in shared log file 133 may be used for any number of purposes. The IP addresses and click paths of various client interactions, for example, could be indicative of security violations or other issues. Click path data can also be useful for audit or compliance purposes. Timestamp data can be indicative of delays or other processing issues, and may therefore be useful in testing APIs or other features. Log data 133 can be used to track the usage or popularity of various features, or for any other reason.

To obtain information about from the log, then, a user typically authenticates with the security module 154 and places a query with a log processing system 152 as appropriate. The log query system 152 suitably processes the query as desired to obtain the requested information from the shared log 133 as described herein.

Additional detail about the log query systems and processes are provided below with respect to FIGS. 2 and 3. The following information, however, will provide additional detail about the various components shown in FIG. 1

The exemplary multi-tenant application server 102 illustrated in FIG. 1 includes a data processing engine 112 that dynamically creates and executes virtual applications 128A-B for multiple tenants based upon data 132 from a common database 130 that is shared between multiple tenants. Data and services generated by the virtual applications 128A-B are provided via network 145 to any number of client devices 140A-B, as desired. In many implementations, virtual applications 128A-B are generated at run-time using a common data processing engine 112 that securely provides access to data 132 in database 130 for each of the various tenants subscribing to system 100. Other implementations may generate applications 128A-B in any other manner. Data processing engine 112 may also include modules that provide additional features, such as security module 154, log processing system 152 and/or the like. Additional detail about the log processing system 152 is provided in FIG. 2 below.

In this context, a "tenant" generally refers to business organization or other group of users that shares access to common data within database 130. Tenants may represent customers, customer departments, business or legal organizations, and/or any other entities that maintain data for particular sets of users within system 100. Although multiple tenants may share access to a common server 102 and database 130, the particular data and services provided from server 102 to each tenant can be securely isolated from those provided to other tenants, as needed. The multi-tenant architecture therefore allows different sets of users to share functionality without necessarily sharing each other's data 132.

Database 130 is any sort of repository or other data storage system capable of storing and managing data 132 associated with any number of tenants. Database 130 may be implemented using any type of conventional database server hardware. In various embodiments, database 130 shares processing hardware 104 with server 102. In other embodiments, database 130 is implemented using separate physical and/or virtual database server hardware that communicates with server 102 to perform the various functions described herein. In various embodiments, the shared data 132 may include log data 133 for the various tenant interactions with server 102, as described more fully below. Although only one database 130 supporting multiple application servers 102A-C is illustrated in FIG. 1, alternate embodiments may use multiple databases 130 to support different servers 102A-C or for any other purpose.

Application server 102 operates with any sort of conventional computing hardware 104, such as any processor 105, memory 106, input/output features 107 and the like. Processor 105 may be implemented using one or more of microprocessors, microcontrollers, processing cores and/or other computing resources spread across any number of distributed or integrated systems, including any number of "cloud-based" or other virtual systems. Memory 106 represents any non-transitory short or long term storage capable of storing programming instructions for execution on processor 105, including any sort of random access memory (RAM), read only memory (ROM), flash memory, magnetic or optical mass storage, and/or the like. Input/output features 107 represent conventional interfaces to networks (e.g., to network 145, or any other local area, wide area or other network), mass storage, display devices, data entry devices and/or the like. In a typical embodiment, processing resources, communications interfaces and other features of hardware 104 using any sort of conventional or proprietary operating system. As noted above, server 102 may be implemented using a cluster of actual and/or virtual servers operating in conjunction with each other, typically in association with conventional network communications, cluster management, load balancing and other features as appropriate. As described above, the data processing engine 112 typically operates as software executing on hardware 104 to provide the various tenant applications 128A-B. Other embodiments may provide the various functions and features shown in FIG. 1 on any sort of distributed, virtual or other hardware 104 as desired.

Data and services provided by server 102 can be retrieved using any sort of personal computer, mobile telephone, tablet or other network-enabled client device 140 on network 145. Typically, the user operates a conventional browser or other client program 142 to contact server 102 via network 145 using, for example, the hypertext transport protocol (HTTP) or the like. In an example implementation, client program 142 uses conventional hypertext transport protocol (HTTP) statements such as "GET" and "PUT" to interact with applications 128. Other embodiments could equivalently use a software application program interface (API) or the like to interact with applications 128 as desired.

FIG. 2 illustrates an exemplary log processing system 152. Generally speaking, the log processing system 152 includes various services that perform various functions as described herein. In the example of FIG. 2, log processing system 152 suitably includes an input module 212, a log query service 214, a data storage 215, a batch server 216 and an output module 218. These functions may be executed by any sort of hardware, software or other logic executing within multi-tenant application server 102, such as hardware 104, as appropriate. Many alternate but equivalent implementations could be created by supplementing or otherwise modifying these general functions in any manner, or by distributing one or more functions to other processing systems.

Input module 210 suitably includes any sort of application program interface (API) 212, web interface 211 and/or other features for receiving inputs from the user's browser or other input application 142. In various embodiments, input module 210 is implemented by data processing engine 112 (FIG. 1) as part of a tenant application 128 executing on the multi-tenant application server 102. Other embodiments may provide input module 210 as a separate web page, network service or other feature as desired. The input module 210 appropriately serves as a user interface for receiving user inputs and providing inputs to log query service 214 for further processing.

Log query service 214 suitably receives user inputs using the interface provided by input module 210, formats suitable database queries as desired, and places the formatted queries into a queue 219 for subsequent processing. Queries may be placed in queue 219 as they are received, or according to any sort of batch process as desired. Log query service 214 may also automatically format the queries in a manner that can be stored in queue 219 and/or posited to analysis engine 220, as desired. In various embodiments, query service 214 compares context data in the information received from the user to ensure that the user is authorized to obtain the requested data. Query service 214 may provide an organizationID, sessionID, userID, IP address and/or other context data to security engine 154, for example, to verify that the requesting user is authorized to obtain the requested data.

In various embodiments, queue 219 is maintained in data storage 215, which may be any physical storage device capable of storing digital data in magnetic, optical or other form. In various embodiments, data storage 215 physically resides within database 130 (FIG. 1), although other embodiments could use a separate database or other storage to maintain the queue 219 of log queries.

Batch server 216 suitably retrieves queries from the queue 219. In some embodiments, log query service 214 provides suitable messages to batch server 216 to notify batch server 216 of times that queries are to be retrieved. In other implementations, batch server 216 simply checks the queue 219 at appropriate times or intervals to retrieve any queries that may have been stored since the last check. Queries may be retrieved, for example, during "off peak" or other times in which the analytics engine 220 is expected to have available resources. The batch server 216 performs any reformatting of retrieved queries to ensure compatibility with analysis engine 220, if needed, and submits the appropriate queries to the data analysis engine 220 for processing.

The data analysis engine 220 is any software, hardware or other system capable of obtaining the data requested by the user queries from the shared log data 133. In various embodiments, analysis engine 220 includes a software program executing on a separate hardware server from log processing system 152. An example of a program that may be used as data analysis engine is the SPLUNK product available from Splunk Inc. of San Francisco, Calif., although any other program could be equivalently used. Other embodiments could implement the data analysis engine 220 as a portion of the log processing system 152 implemented within data processing engine 112 of system 102, or in any other manner.

The batch server 216 also receives processed jobs that are completed by data analysis engine 220 for storage as appropriate. In various embodiments, query results are stored within data storage 215, although other embodiments could store results in other physical or logical storage, as desired. In some implementations, batch server 216 combines the results from multiple queries or multiple jobs submitted to the analytics engine 220 as needed. Retrieved jobs may be formatted in any manner; in one embodiment, the received jobs are formatted as comma separated values (CSV) or other raw data. Other embodiments could format any sort of dashboards, analytics, reports or other processed outputs that graphically or otherwise represent the underlying data in an easy-to-comprehend format.

When the query has been processed, output module 218 suitably notifies the user via email, instant message or the like. The user is then able to retrieve the processed job using interfaces 211, 212 or the like. In other embodiments, processed jobs may be emailed or otherwise sent directly to the user without requiring additional storage, although storing the processed jobs for retrieval by an authenticated user would improve the security of the system.

The architecture shown in FIG. 2 improves security by shielding the interface to the analysis engine 220 from free-form queries. That is, by preventing direct access to the interface and by ensuring that only certain queries can be made, attacks on the analysis engine 220 can be substantially curtailed, if not eliminated.

Further, the architecture shown in FIG. 2 allows for scheduling and batch processing of log file queries, which can substantially reduce the demands upon computing hardware or other resources associated with analysis engine 220. Batch service 216 can be configured to only obtain queries from queue 219 when sufficient resources are available, for example, or only at certain times of the day, week or month when resources are known to be otherwise underutilized. Further, batch service 216 can balance processing loads across multiple data analysis engines 220 in some embodiments, therefore further improving system performance. Even further, batch service 216 could temporarily freeze processing of queries if the analytics engine 220 goes offline for any reason by simply maintaining the queries in queue 219 until such time as the analytics engine 220 becomes available again.

FIG. 3 shows an exemplary process 300 for obtaining secure access to data that is stored in a shared electronic log 133. As shown in FIG. 3, the user operates a browser or other client application 142 to initially authenticate with the application server 102 (function 302). In various embodiments, the user provides a userid/password combination, or some other credential, that is provided to security module 154 for authentication. In other embodiments, client application 142 provides a token, cookie or other credential that can be verified by security module 154 as appropriate. Security module 154 suitably returns a SessionID or other credential that can be used by the client application in subsequent communications with application 128.

As the user interacts with application 128 (function 304), system 102 logs the user's actions within log 133 as described above (function 306). Various embodiments may store the entire "click trail" of the user's actions; other embodiments may choose to log only certain actions of interest. As noted above, the information stored for each client action may include context information such as IP address, UserID, SessionID, ClientID or the like, as well as information about the particular action taken by the user. In embodiments based upon HTTP constructs, the user's web browser issues HTTP "get" requests to application 128 that contain the SessionID obtained from security module 154. Application 128 processes each request (function 308), provided that the user has access to the requested data, and returns an appropriate response 310 as desired.

When the user wishes to place a query for shared log data (function 312), he or she appropriately provides the parameters of the query using any available mechanism. The input module 210 described above, for example, could provide an API 210 and/or a GUI or other interface 211 for receiving user inputs and formulating queries, as described above.

Log query service 214 appropriately verifies that the user requesting the query is authorized to obtain access to the requested data (function 314). If the query is authorized, then log query service 214 appropriately and automatically formats a query that can be forwarded 318 for storage in queue 219 on data storage 215 (function 319). Additional queries from the same or different users may be stored in the same queue 219 prior to processing, as desired.

As noted above, batch service 216 retrieves queries from storage 215 for subsequent processing. To that end, batch service 216 suitably polls or otherwise request queries (function 320) from data storage 215, and data storage 215 returns the requested queries (function 322) as appropriate. Queries may be obtained according to any temporal scheme. In some implementations, queries are obtained whenever analysis engine 220 has available capacity. Alternatively, queries may be obtained at particular times of the day when processing loads are otherwise expected to be relatively low. In still other embodiments, queries may be retrieved at a schedule that is dictated by query service 214 or another portion of log processing system 152, as desired.

Batch service 216 performs any needed format conversion (e.g., to place the query into a format that is compatible with an API associated with analysis engine 220), and submits the queries received from queue 219 to the analysis engine 220 as appropriate (function 324). The analysis engine 220 performs the analysis described in the query to obtain the requested and authorized data from the shared log 113 (function 326). The results 328 of the analysis are then stored for subsequent retrieval by the user. FIG. 3 shows that results 328 are forwarded to output module 218 so that the user can be notified that the results are ready to be retrieved. Other embodiments may alternately return results to the batch processing service 216 for storage (e.g., in data storage 215 or elsewhere), or to another destination as desired.

Output module 218 suitably notifies the user that the results are available in any appropriate manner (function 330). In various embodiments, output module 218 sends an email, instant message, text message or the like. The user is then able to request the results (function 332) and, after authenticating, to receive the results (function 334) in any appropriate manner. FIG. 3 shows the output module 218 as managing the results delivery process; in practice, results may be delivered via an interface or other feature associated with an application 128, with input module 210 (FIG. 2), or in any other manner. As noted above, results may be delivered in relatively raw form (e.g., as CSV values) for subsequent processing by the user. Alternatively, the results may be processed by output module 218, application 128, client application 142 and/or any other portion of system 100 to provide a dashboard, graphical image, or other processed output that is indicative of the data obtained from the query.

By providing the customer with detailed log data in a secure manner, the service provider is able to increase customer visibility and to provide very useful features that were not previously available. Using the techniques and systems described herein, a user or administrator of a shared multi-tenant application server can, for the first time, be able to obtain access to detailed information that is securely extracted from the shared electronic log. By using the queuing concepts described herein, the interface to the analysis engine can be shielded from direct user inputs, thereby greatly restricting the opportunity for unauthorized access to log data. Moreover, the queuing systems can provide load balancing and load optimization benefits that would not be otherwise available.

As noted above, the various functions and features of log processing system 152 and process 300 may be carried out with any sort of hardware, software and/or firmware logic that is stored and/or executed on any platform. Some or all of processing system 152 may be carried out, for example, by logic executing within one or more systems shown in FIG. 1. For example, various components shown in FIG. 2 (e.g., components 210, 214, 215, 216 and/or 218) may be partially or entirely implemented using software or firmware logic that is stored in memory 106 and executed by processor 105 as part of one or more application platforms 102.

Equivalent embodiments, however, may implement one or more of these components using separate physical and/or logical computing resources as desired. The particular hardware, software and/or firmware logic that implements any of the various functions shown in FIG. 2 or 3 may therefore vary from context to context, implementation to implementation, and embodiment to embodiment in accordance with the various features, structures and environments set forth herein. The particular means used to implement each of the various functions shown in FIGS. 2 and 3, then, could be any sort of processing structures that are capable of executing software and/or firmware logic in any format, and/or any sort of application-specific or general purpose hardware, including any sort of discrete and/or integrated circuitry residing in any sort of host system, as desired.

Various exemplary systems and processes for validating domain name services and/or other configuration information have therefore been described. The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of the invention in any way. To the contrary, various changes may be made in the function and arrangement of the various features described herein without departing from the scope of the claims and their legal equivalents.

What is claimed is:

1. A data processing system to process log data relating to usage of a multi-tenant application system, the data processing system comprises:
   a data storage device;
   a data analysis engine executing on a processor, wherein the data analysis engine is configured to extract requested information from the log data relating to the usage of the multi-tenant application system based upon a database query;

an input module configured to receive a request from a user, wherein the request identifies requested log data relating to usage of the multi-tenant application system;

a log query service configured to automatically format the database query for the requested log data based upon the request received from the user, and to store the formatted database query on the data storage device;

a batch server configured to retrieve the formatted database query from the data storage device, to submit the formatted database query to the data analysis engine, to obtain the requested information from the data analysis engine, and to notify the user that the requested information is available for output.

2. The data processing system of claim 1 wherein the input module provides a graphical interface that allows the user to construct the database query.

3. The data processing system of claim 1 wherein the input module comprises an application program interface to a client application executable on a computer system operable by the user, and wherein the database query is received from the client application via the application program interface.

4. The data processing system of claim 1 wherein the multi-tenant application system comprises a second processor configured to execute both the log query service and the batch server.

5. The data processing system of claim 1 wherein the data analysis engine is configured to receive the database query only from the batch server, thereby preventing database queries from being received directly from the input module or the log query service.

6. The data processing system of claim 1 further comprising an authentication system associated with the multi-tenant application system, wherein the log query service is further configured to authenticate the user with the authentication system before storing the formatted database query on the data storage.

7. The data processing system of claim 6 wherein the request received from the user comprises an identifier that identifies the user, and wherein the log query service provides the identifier to the authentication system to thereby authenticate the user.

8. A computer-implemented method performed by a log processing system to securely provide log information to a user relating to usage of a multi-tenant application server, wherein the user is associated with one of a plurality of tenants using the multi-tenant application server, the method comprising:

receiving, at the data processing system, a request from the user that identifies the user and requested log data from the multi-tenant application server;

placing the request in a log query storage queue, wherein the placing is performed by a first processing module;

subsequently retrieving the request from the log query storage queue, wherein the retrieving is performed by a second processing module that is separate from the first processing module;

submitting the retrieved request by the second processing module to a data analysis module to obtain the requested log data from the multi-tenant application server, wherein only the second processing module is allowed to submit requests to the data analysis module to thereby preserve the security of the data analysis module; and notifying the user that the requested log data is available for delivery to the user.

9. The method of claim 8 further comprising the second processing module scheduling a time in the future for the retrieving of the request from the log query storage queue.

10. The method of claim 8 further comprising verifying that the user is authorized to receive the requested log data.

11. The method of claim 10 wherein the request received from the user comprises an identifier that identifies the user, and wherein the verifying comprises submitting the identifier to the multi-tenant application server to confirm that the user is authorized to receive the requested log data.

12. The method of claim 8 wherein the placing is performed by a first processing module and wherein the retrieving and submitting are performed by a second processing module that is separate from the first processing module, and wherein the method further comprises the first processing module verifying the identity of the user before placing the request in the log query storage queue.

13. The method of claim 8 wherein the request identifies a second user of the multi-tenant application server that is associated with the same tenant as the user, and wherein the requested log data comprises a listing of the second user's interactions with the multi-tenant application server.

14. The method of claim 13 wherein the requested log data comprises a subset of the second user's interactions with the multi-tenant application server, and wherein the method further comprises filtering the listing of the second user's interactions with the multi-tenant application server based upon constraints contained within the request to extract the subset of the second user's interactions for the requested log data.

15. The method of claim 14 further comprising creating a graphical representation of the subset of the second user's interactions for the requested log data.

16. A multi-tenant application server comprising:

a processor configured to simultaneously execute a plurality of applications each associated with at least one of a plurality of tenants, wherein all user interactions with any of the plurality of applications are recorded in a shared log file;

a non-transitory shared data storage configured to maintain the shared log file and data associated with each of the plurality of tenants; and a data processing engine executable on the processor, wherein the data processing engine comprises:

a log query service configured to receive queries for requested log information associated with one of the plurality of tenants and to store the queries in the shared data storage for later execution; and a batch processor configured to retrieve the queries stored in the shared data storage at a later time and that provides the retrieved queries to a data analysis module that obtains the requested log information associated with one of the plurality of tenants of the multi-tenant application server from the shared log file, wherein the data analysis module is configured to process the queries received only from the batch processor to thereby preserve the security of the data analysis module.

17. The multi-tenant application server of claim 16 further comprising an authentication module executable by the processor, wherein the log query service is configured to obtain user identifiers from the received queries and to provide the user identifiers to the authentication module prior to storing the shared queries in the shared data storage to thereby verify that the users placing the queries are authorized to receive the requested log information.

* * * * *